United States Patent [19]
Aydt et al.

[11] Patent Number: 5,765,904
[45] Date of Patent: Jun. 16, 1998

[54] FOLDING TOP FOR VEHICLES

[75] Inventors: Matthias Aydt, Eberdingen; Kurt Pfertner, Wimsheim; Alexander Zeissner, Illingen; Peter Thomas, Oberdorf; Christof Blech, Rinningen, all of Germany

[73] Assignee: Dr. Ing .h.c.f. Porsche A G

[21] Appl. No.: 561,970

[22] Filed: Nov. 22, 1995

[30] Foreign Application Priority Data

Nov. 23, 1994 [DE] Germany .............. 44 41 668.7

[51] Int. Cl.⁶ ........................................ B60J 7/12
[52] U.S. Cl. ........................................... 296/107
[58] Field of Search .................... 296/107, 108, 296/16, 121, 118

[56] References Cited

U.S. PATENT DOCUMENTS

| | | |
|---|---|---|
| 2,482,323 | 9/1949 | Cromwell et al. ............ 296/107 |
| 3,075,804 | 1/1963 | Geiger et al. ................ 296/107 |
| 4,720,134 | 1/1988 | Seifert ........................ 296/118 |
| 4,747,635 | 5/1988 | Wagner ...................... 296/107 |

FOREIGN PATENT DOCUMENTS 8808136.2  10/1988  Germany .
3834858A1  4/1990  Germany .
0521307A1  1/1993  Germany .

*Primary Examiner*—Dennis H. Pedder
*Attorney, Agent, or Firm*—Evenson McKeown Edwards & Lenahan PLLC

[57] ABSTRACT

A folding top for passenger car vehicles is disclosed which can be displaced from a vehicle top closed position into a rearside deposited position and is composed of a supporting folding top structure and a folding top covering interacting therewith. The folding top structure includes a dimensionally stable folding top section which, in the closed position, is arranged adjacent to a windshield frame and can be displaced into the vehicle rear area in such a manner that the outer boundary surface of the dimensionally stable folding top section facing away from the passenger compartment is always directed upwards during the whole adjustment movement. The linking of the folding top covering to the longitudinal sides is designed in such a manner that, in addition to a smooth opening and closing of the folding top, tolerances of the folding top covering can be compensated and an overstretching of the folding top covering during the opening and closing is avoided. It is provided that the folding top covering, on the vehicle longitudinal sides, is fastened to the dimensionally stable folding top section and is fastened on a main hoop, whereas the folding top covering rests, without being fastened, against a B-column of the folding top structure disposed in-between and is pulled by means of a tension rope and a fabric control in a defined manner into a receiving device provided on the B-column.

16 Claims, 7 Drawing Sheets

FOLDING TOP FOR VEHICLES

BACKGROUND AND SUMMARY OF THE INVENTION

This invention relates to a folding top for vehicles, particularly passenger cars, which can be displaced from a closed position into a rear-side deposited position and includes a supporting folding top structure and a folding top covering interacting therewith, a dimensionally stable folding top section of the folding top structure being arranged adjacent to the windshield frame in a closed position and being displaceable into a rear vehicle area in such a manner that, during its whole adjusting movement, an outer boundary surface of the dimensionally stable folding top section which faces away from a passenger compartment is always directed upwards.

In the case of a known folding top of the initially mentioned type (European Patent Document EP 0 521 307A1), the folding top covering is braced in the closed position between a rearward area surrounding the rear window and a forward edge area above the windshield. This document supplies no information on the linking of the folding top covering to the longitudinal sides of the folding top structure.

It is an object of the invention to design the linking of the folding top covering on the longitudinal sides in such a manner that, in addition to a smooth opening and closing of the folding top, an operationally appropriate tightness is achieved, tolerances of the folding top covering are compensated and an overstretching of the folding top covering during the opening and closing is avoided.

According to the invention, this object is achieved by providing an arrangement wherein the folding top covering is fastened on both longitudinal parts of the folding top at one side on the dimensionally stable folding top section and on the other side on a main hoop, and wherein the folding top covering rests without being fastened on a B-column of the folding top structure disposed between the dimensionally stable folding top section and the main hoop and is pulled by means of a tension rope and a fabric control during the closing of the folding top into a receiving device provided on the B-column.

Important advantages achieved by means of the invention are that, by means of the only partially fixed linking of the folding top covering on the longitudinal sides of the folding top structure, a smooth opening and closing of the folding top is achieved.

On the one hand, the folding top covering is fastened to the dimensionally stable forward folding top section and, on the other hand, it is fastened on the main hoop, whereas, the folding top covering rests against a B-column of the folding top structure without being fastened.

By means of a tensioning rope on the edge of the folding top covering provided in the area of the B-column and by means of a fabric control, the folding top covering is automatically pulled in the closed position of the folding top into the receiving device provided on the B-column so that it has a tight wrinkle-free outer contour and an operationally appropriate sealing is achieved between the folding stop covering and the B-column.

The automatic fabric control is formed by a stretch band interacting with the folding top covering in certain preferred embodiments of the invention. A spring-loaded slide or a spring-loaded flap forms the automatic fabric control in certain preferred embodiments. The fabric control is desirable because, during the opening and closing of the folding top, a relative movement takes place from the B-column and the main hoop in the transverse direction of the vehicle and, in segments, the folding top covering must be moved faster back in the longitudinal direction of the vehicle than the adjoining components of the folding top such as the B-column and main hoop.

Other objects, advantages and novel features of the present invention will become apparent from the following detailed description of the invention when considered in conjunction with the accompanying drawings.

DETAILED DESCRIPTION OF THE DRAWINGS

Figure 1:
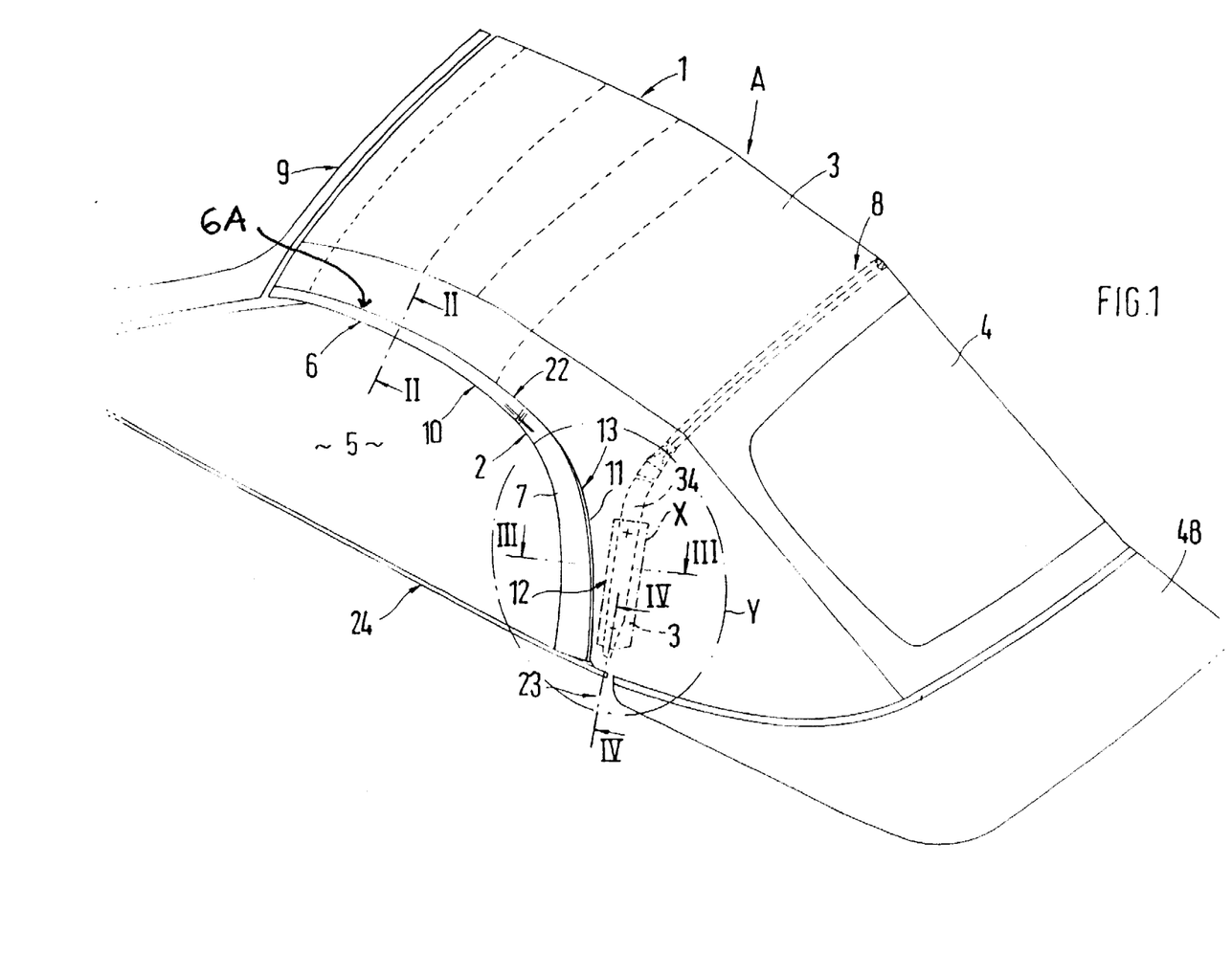
FIG. 1 is a schematic perspective partial view diagonally from the rear of a passenger car with a folding top constructed according to preferred embodiments of the present invention.

A folding top 1 for a vehicle, particularly for a passenger car, comprises a supporting folding top structure 2 and a folding top covering 3 fastened thereto. In a rearward area, the folding top covering 3 has a rear window 4 which is formed by a rigid or flexible viewing pane. The folding top 1 can be displaced from a closed position A spanning a passenger compartment 5 into a rear-side deposited position, which is not shown, and vice versa.

The only sections of the folding top structure 2 which are shown is a large-surface, forward, inherently rigid folding top section 6, the B-columns 7 and a main bow 8 which spans the passenger compartment 5 in the transverse direction in a curved manner.

The forward folding top section 6, the B-columns 7 and at least laterally exterior, upright sections 34 of the main hoop 8 are formed by cast metal parts made of a light metal alloy.

The large-surface, dimensionally stable Folding top section 6 extends adjacent to the windshield frame 9 in the closed position A. When the folding top 1 is folded back, the section 6 is displaced into the rear area in such a manner that, during the whole adjusting movement, the outer boundary surface 6A of section 6 is always directed upwards. The folding top section 6, when displaced to the rear, forms a covering between the passenger compartment 5 and the folding top compartment lid 48 situated behind it.

On its forward, transversely extending edge, the folding top covering 3, in a manner not shown in detail, is connected by way 5 of detachable fastening elements with the folding top section 6, whereas the rearward edge of the folding top covering 3 is detachably fastened on a rear-side tensioning bow. In addition, the folding top covering 3 is fixed on the rearward edge of the folding top section 6 so that, in all positions, the folding top section 6 is covered by a tensioned folding top covering 3.

Figure 2:
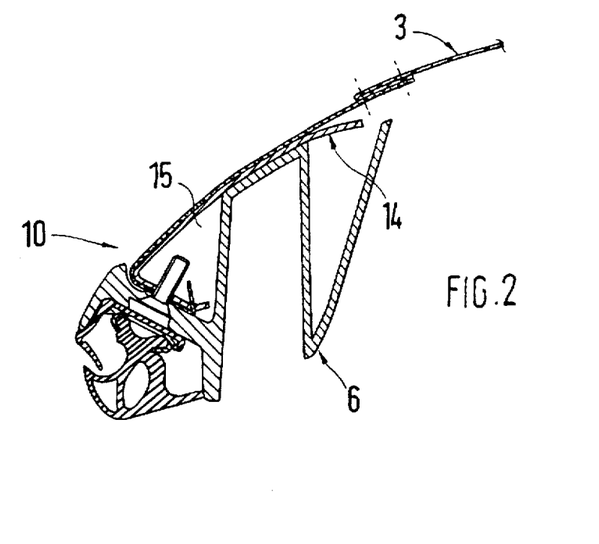
FIG. 2 is an enlarged sectional view taken along Line II—II of FIG. 1.

On the two longitudinal sides 10 of the folding top 1, the folding top covering 3 is fastened to the dimensionally stable folding top section 6 on the one side and, on the other side, to the main hoop 8, whereas the folding top covering 3 rests without being fastened on the B-column 7 of the folding top structure 2 situated in-between. In the closed position A of the folding top 1, the folding top covering 3 is pulled by means of a tensioned rope 11 and a fabric control 12, into a receiving device 13 provided on the B-column 7. Along the longitudinal course of the forward folding top section 6, the folding top covering 3 is fastened by means of an interior holding strip 14 on a lateral receiving device 15 of the folding top section 6 (FIG. 2).

The receiving device 15 provided on the B-column 7 is formed by a partial area of the B-column 7 and a locking plate 16 fitted onto the B-column 7. The fastening of the locking plate 16 on the B-column 7 takes place, for example, by means of screws, rivets, or the like.

A sealing body 17 extends inside the receiving device 13.

The sealing body 17 comprises an elongated, clamped-in foot section 18 and a hollow profile section 19 disposed above it, the longitudinally exterior edge 20 of the folding top covering 3 resting on this hollow profile section 19.

On the lateral edge 20 of the folding top covering 3, at least along the longitudinal course of the B-column 7, a weatherstrip part 21 made of plastic is arranged which has an inserted, edge-side tensioning rope 11, a forward end of the tensioning rope 11 being fixed at reference number 22 on a holding strip 14 fastened to the adjacent forward folding top section 6.

The other end 23 of the tensioning rope 11 is pivotally connected below the belt line 24 on the main hoop 8. According to FIG. 4, the end 23 of the tensioning rope 11 is anchored on a swivellable fitting part 25, in which case the fitting part 25 can be adjusted in the transverse direction by means of an adjusting screw 26.

Figure 4:
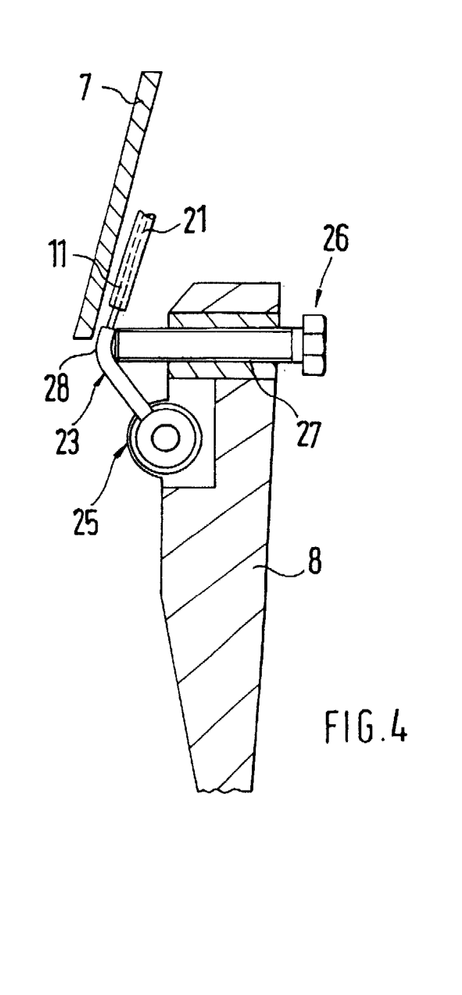
FIG. 4 is an enlarged sectional view taken along Line IV—IV of FIG. 1.

The adjusting screw 26 is screwed into a horizontally aligned threaded bore 27 of the main hoop 8 and interacts by means of its free end with a sleeve section 28 of the swivellably disposed fitting part 25.

As a result of the pivots and the outer contour of the B-column 7 and the main hoop 8, during the opening and closing, a relative movement takes place in the transverse direction, and a fabric control 12 must take place in such a manner that the folding top covering 3 in partial areas is returned faster in the X-direction (longitudinal direction) than the adjacent components (B-column 7, main hoop 8). When the folding top 1 is swivelled back, the B-column moves inward.

Figure 3:
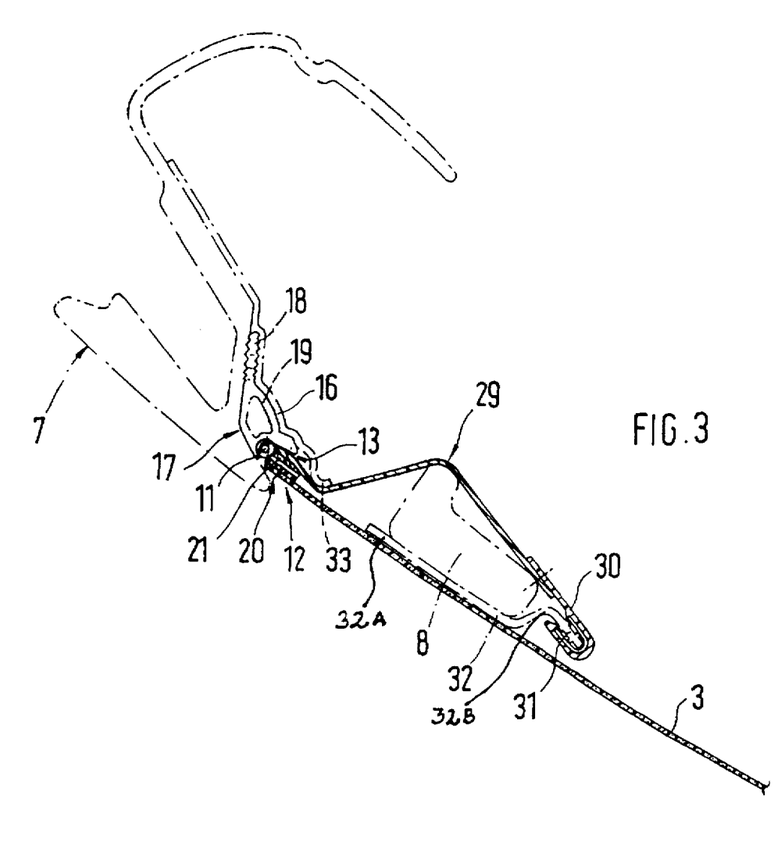
FIG. 3 is an enlarged sectional view taken along Line III—III of FIG. 1.

The fabric control 12 required during the opening and closing of the folding top 1, according to a first embodiment, is formed by a stretch band 29 which interacts in a supporting manner with the interior side of the main hoop 8 (FIG. 3).

On its one end, the stretch band 29 is sewn to the lateral edge 20 of the folding top covering 3 or the weatherstrip part 21. The other end of the stretch band 29 is connected with a fitted-on profile 30 which is placed on a bent flange 31 of a holding plate 32. The oblong holding plate 32, which extends in the vertical direction, is held in position by way of fastening elements on the exterior side of the main hoop 8. The holding plate 32 projects in areas 32A, 32B beyond the main hoop 8 toward the front and rear (FIG. 3). Adjacent to the weatherstrip part 21, the stretch band 29 is deflected toward the inside by means of an end-side bending 33 of the locking plate 16. By means of the stretch band 29, the folding top covering 3 is moved toward the interior in the direction of the receiving device 13 when the folding top 1 is closed.

Figure 5:
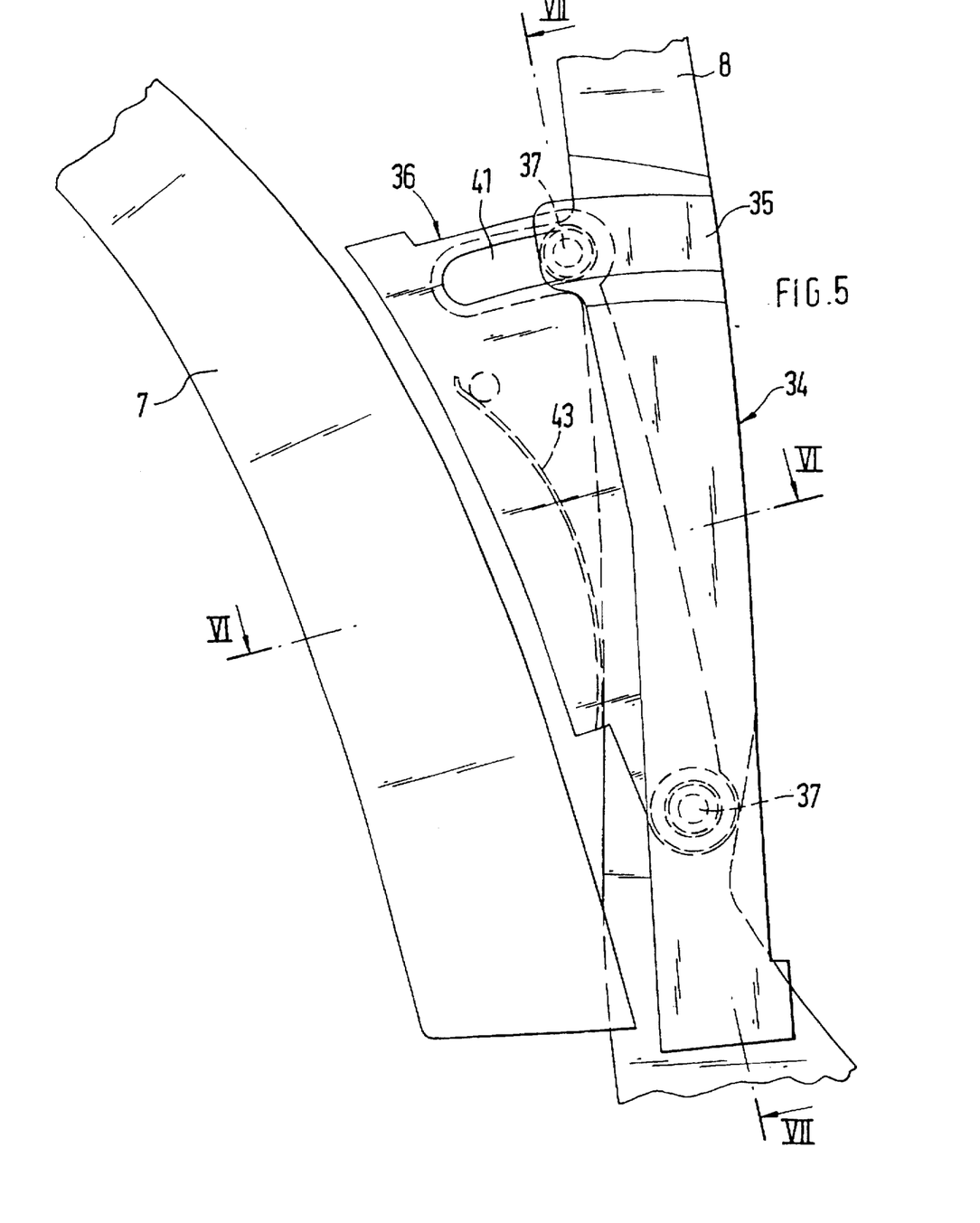
FIG. 5 is an enlarged view of cut-out X of FIG. 1 showing another embodiment of a fabric control.
Figure 6:
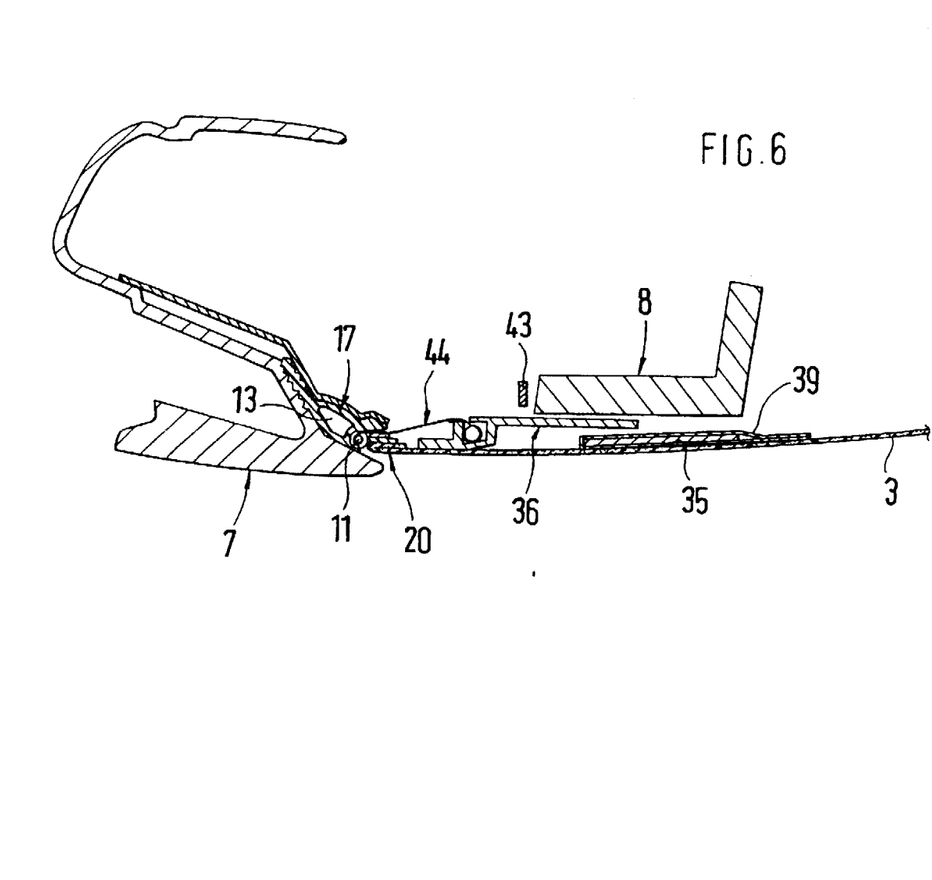
FIG. 6 is a sectional view taken along Line VI—VI of FIG. 5.
Figure 7:
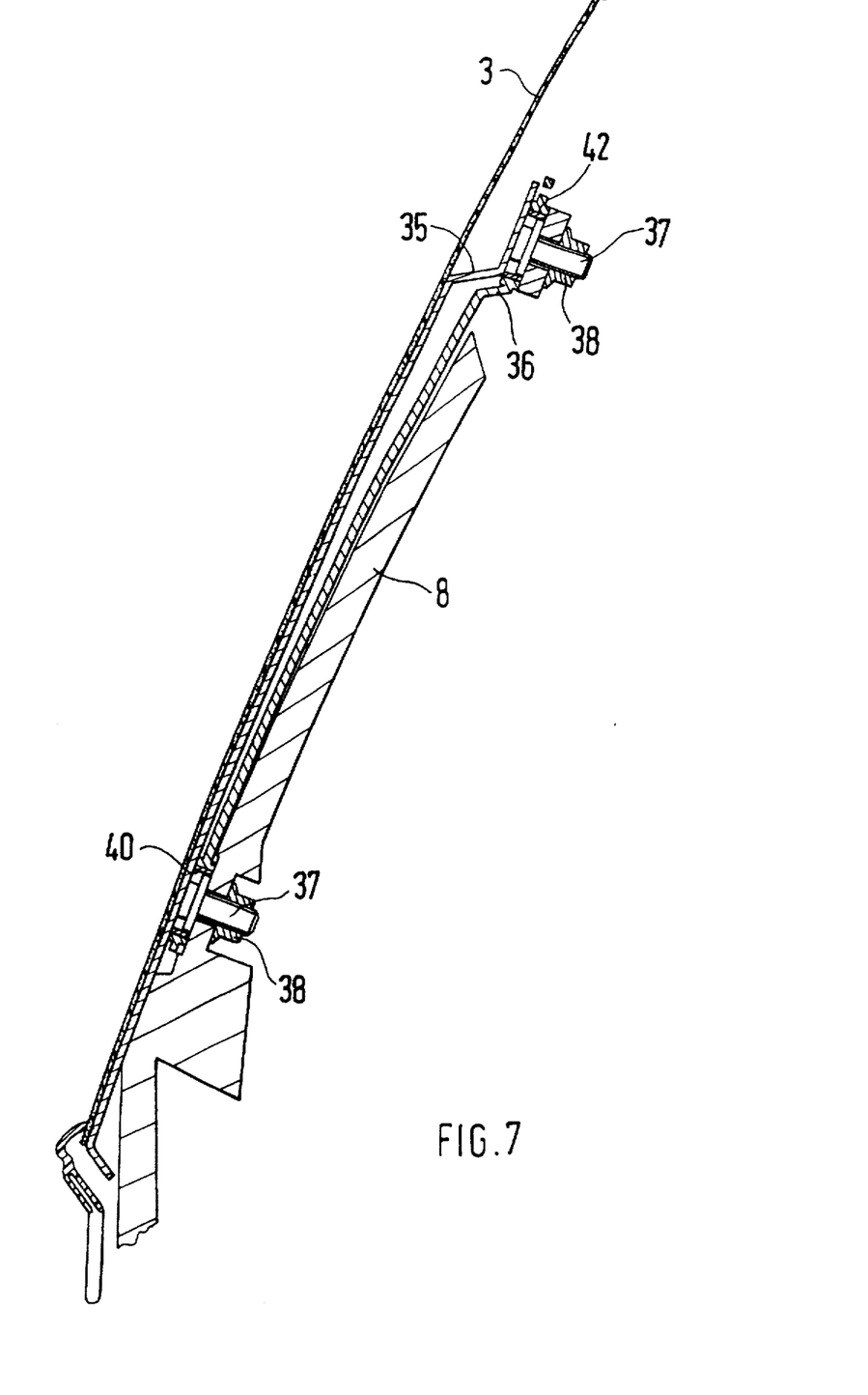
FIG. 7 is a sectional view taken along Line VII—VII of FIG. 5.

A second embodiment of a fabric control 12 is illustrated in FIGS. 5 to 7. In this version, a clamping strip 35 with a spring-loaded slide 36 is arranged on the upright section 34 of the main hoop 8. Viewed in the vertical direction, the clamping strip 35 is held in position on the main hoop 8 by way of two spaced weld pins 37 and nuts 38.

Between the fastening points, the clamping strip 35 is continuously surrounded by a tension strip 39 which is connected with the interior side of the folding top covering 3 by way of a Meltex band. The spring-loaded slide 36 is disposed so that it can be rotated about a distance sleeve 40 surrounding the lower weld pin 37. On its upper end, the slide 36 has a longitudinally directed guide slot 41 which is in an operative connection with a sleeve 42 surrounding the upper weld pin 37.

The bent spring element 43 interacting with the slide 36 is fastened on its one end on the main hoop 8. The other end of the spring element 43 is disposed on the slide 36 and attempts to move it into the direction of the main hoop 8. In the embodiment shown, the spring element 43 is formed by a leaf spring.

At least along a partial area of the vertical course of the clamping strip 35, the lateral edge area 20 of the folding top covering 3 is connected by way of a tension strip 44 with the interior side of the slide 36. On its one end, the tension strip 44 is fastened on the weatherstrip part 21 (compare FIG. 3). The other end of the tension strip 44 is fastened on the slide 36.

Figure 8:
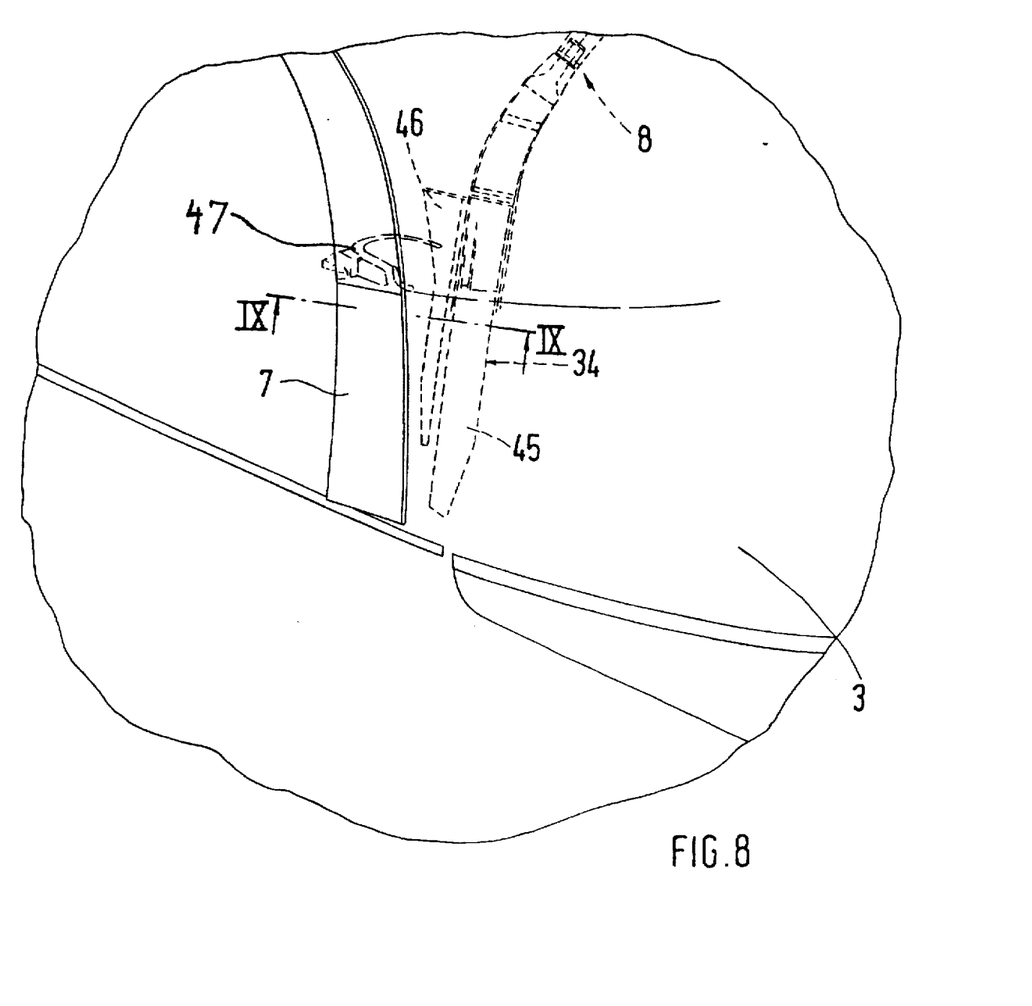
FIG. 8 is an enlarged view of cut-out Y according to FIG. 1 showing a third embodiment of a fabric control.
Figure 9:
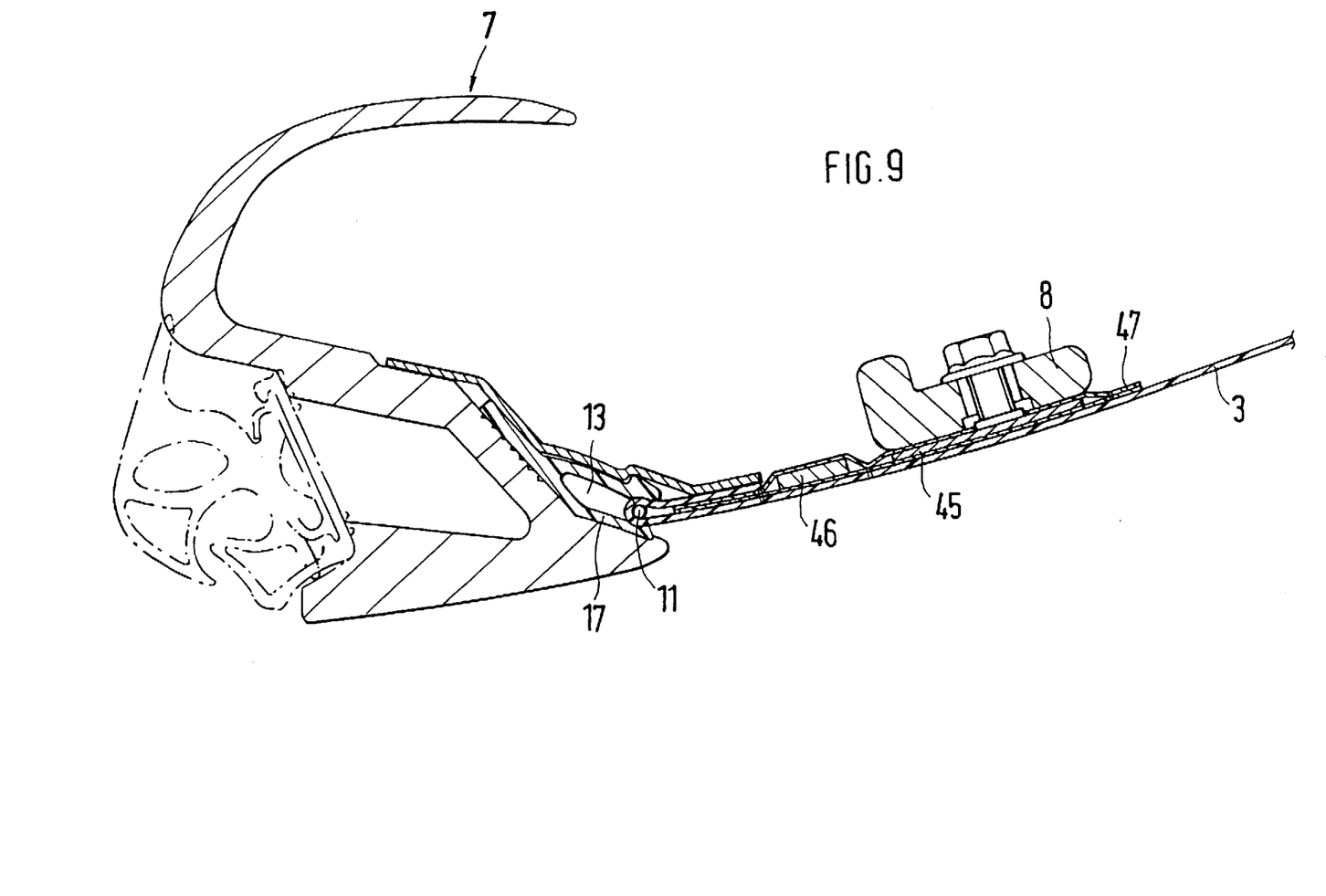
FIG. 9 is an enlarged sectional view taken along Line IX—IX of FIG. 8.

A third embodiment of the fabric control 12 is illustrated in FIGS. 8 and 9. In this version, in the area of the upright section 34 of the main hoop 8, a clamping strip 45 and a springloaded flap 46 situated in front of it are connected with the folding top covering 3. The clamping strip 45 and the flap 46 are sewn into a joint double-sided retaining strip 47 which is connected with the folding top covering 3.

The clamping strip 45 is locally screwed to the main hoop 8. The spring element, which is not shown in detail, is fastened to the main hoop 8 and, with its other end, interacts with the flap so that this flap is acted upon toward the inside in the direction of the receiving device 13.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Folding top for a passenger vehicle which can be displaced from a closed position into a rear-side deposited position and includes a supporting folding top structure arid a folding top covering interacting therewith, a dimensionally stable folding top section of lisle folding top structure being an arranged adjacent to a windshield frame in a top closed position and being displaceable into a rear vehicle area wherein the supporting holding top structure includes a main hoop and a pair of longitudinal parts which ill use extend along opposite lateral sides of the folding top section, wherein the folding cop covering is fastened a forward location on both longitude parts and at a rearward location on the main hoop, and wherein the folding top covering rests B-columns of the folding top structure disposed between the dimensionally stable folding top section and the main hoop and is pulled by means of a tension rope and a fabric control during the closing of the folding top into respective receiving devices provided on the B-columns %.

2. Folding top according to claim 1, wherein the respective receiving devices provided on the B-columns are formed by a partial area of the associated B-column and a profiled locking plate fitted onto the associated B-column.

3. Folding top according to claim 1, wherein a sealing body is arranged within each receiving device, laterally exterior edges of the folding top covering resting o n the sealing bodies.

4. Folding top according to claim 2, wherein a sealing body is arranged within each receiving device, the laterally exterior edges of the folding top covering resting on the sealing bodies.

5. Folding top according to claim 1, wherein weatherstrip parts made of plastic are arranged on lateral edges of the folding top covering, at least along a longitudinal course of the respective B-columns, which weatherstrip parts each have an inserted, edge-side tensioning rope, an end of the tensioning rope being fastened on a holding strip fastened on the adjacent forward folding top section, whereas the other end of the tension rope is pivotally connected below a vehicle belt line on the main hoop.

6. Folding top according to claim 5, wherein a sealing body is arranged within the each receiving device, the laterally exterior edges of the folding top covering resting on the sealing bodies.

7. Folding top according to claim 4, wherein weatherstrip parts made of plastic are arranged on lateral edges of the folding top covering, at least along a longitudinal course of the respective B-columns, which weatherstrip parts each have an inserted, edge-side tensioning rope, an end of the tensioning rope being fastened on a holding strip fastened on the adjacent forward folding top section, whereas the other end of the tension rope is pivotally connected below a vehicle belt line on the main hoop.

8. Folding top according to claim 1, wherein the fabric control is formed by an interior stretch band interacting with the interior side of the main hoop.

9. Folding top according to claim 8, wherein one end of the stretch band is connected with an edge area of the folding top covering, wherein the other end of the stretch band is fitted, by way of a connected fitted on profile, onto a flange of a holding plate, the holding plate being fastened on the exterior side of the main hoop.

10. Folding top according to claim 1, wherein the fabric control is formed by a spring-loaded slide connected with an edge area of the folding top covering, which slide is swivellably disposed on a clamping strip held in position on the main hoop.

11. Folding top according to claim 10, wherein the slide is disposed so that it can be swivelled about a lower pivot, and wherein the swivel motion is bounded by a longitudinally extending slot guide constructed on the slide,an element of the clamping strip engaging with said slot guide.

12. Folding top for a convertible passenger car, comprising a folding top covering of flexible fabric material, and a supporting folding top structure supporting the a folding top covering.

said supporting folding top structure including;
  (i) a dimensionally stable section which in a top closes position is disposed adjacent a vehicle front windshield frame and in a top open position is disposed rearward of vehicle passenger seats,
  (ii) a B-column section which in a top closed position extends behind the stable section and vertically above a vehicle belt line from a position behind a vehicle front side window, and
  (iii) a main hoop section which in a top closed position is disposed behind the B-column section, wherein said folding top covering is fastened to the dimensionally stable section and the main hoop section and rests on the B-column section, and wherein fabric control means are provided for pulling the folding top covering into a receiving device on the B-column section during closing movements of the top, whereby movements of said folding top structure during opening and closing operations are accommodated while assuring a smooth tuat configuration of the folding top covering when in a vehicle top closed position and while avoiding overstretching of the folding top covering.

13. Folding top according to claim 12, wherein said fabric control means includes an interior stretch band interacting with a vehicle interior side of the main hoop section.

14. Folding top according to claim 13, wherein one end of the stretch band is connected with an edge area of the folding top covering, and wherein the other end of the stretch band is fitted, by way of a connected fitted-on profile, onto a flange of a holding plate, the holding plate being fastened on the exterior side of the main hoop section.

15. Folding top according to claim 16, wherein the fabric control is formed by a spring-loaded slide connected with an edge area of the folding top covering, which slide is swivellably disposed on a clamping strip held in position on the main hoop section.

16. Folding top according to claim 15, wherein the slide is disposed so that it can be swivelled about a lower pivot, and wherein the swivel motion is bounded by a longitudinally extending slot guide constructed on the slide, which slot guide is in an operative connection with the clamping strip.

* * * * *